United States Patent
Yue et al.

(10) Patent No.: US 12,353,524 B2
(45) Date of Patent: Jul. 8, 2025

(54) METHOD AND SYSTEM OF PROTECTING MODEL, DEVICE, AND STORAGE MEDIUM

(71) Applicant: BEIJING BAIDU NETCOM SCIENCE TECHNOLOGY CO., LTD., Beijing (CN)

(72) Inventors: Shuangyan Yue, Beijing (CN); Zhongkai Fan, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/915,705

(22) PCT Filed: Mar. 22, 2022

(86) PCT No.: PCT/CN2022/082285
§ 371 (c)(1),
(2) Date: Sep. 29, 2022

(87) PCT Pub. No.: WO2023/029447
PCT Pub. Date: Mar. 9, 2023

(65) Prior Publication Data
US 2024/0211609 A1 Jun. 27, 2024

(30) Foreign Application Priority Data
Aug. 30, 2021 (CN) .......................... 202111007976.8

(51) Int. Cl.
*G06F 21/12* (2013.01)
*G06F 21/14* (2013.01)
(Continued)

(52) U.S. Cl.
CPC .......... *G06F 21/128* (2013.01); *G06F 21/14* (2013.01); *G06F 21/602* (2013.01); *G06F 21/64* (2013.01)

(58) Field of Classification Search
CPC ...... G06F 21/128; G06F 21/14; G06F 21/602; G06F 21/64
See application file for complete search history.

(56) References Cited

U.S. PATENT DOCUMENTS

| 2018/0184037 A1 | 6/2018 | Toba et al. |
| 2020/0184037 A1 | 6/2020 | Zatloukal et al. |
(Continued)

FOREIGN PATENT DOCUMENTS

| CN | 108965258 | 12/2018 |
| CN | 110268410 | 9/2019 |
(Continued)

OTHER PUBLICATIONS

Yang, Zhiqiang; Liu, Han; Li, Yue; Zheng, Huixuan; Wang, Lei; Chen, Bangdao; "Seraph: Enabling Cross-Platform Security Analysis for EVM and WASM Smart Contracts," IEEE/ACM 42nd International Conference on Software Engineering: Companion Proceedings (ICSE-Companion), Seoul, Korea (South), Oct. 5-11, 2020, pp. 21-24.*

(Continued)

*Primary Examiner* — Victor Lesniewski
(74) *Attorney, Agent, or Firm* — Pillsbury Winthrop Shaw Pittman, LLP

(57) ABSTRACT

A method of protecting a model, which relates to a field of computer, a field of artificial intelligence, and may be applied to an AI model protection scenarios. The method includes: generating a WASM file for providing a runtime environment for a target model, the WASM file containing a corresponding model inference algorithm and security verification algorithm, wherein the security verification algorithm is configured to perform at least one security verification operation to protect the target model, the at least one security verification operation is selected from: a verification of a host environment; a verification of an integrity (Continued)

of the WASM file; a verification of an integrity of the model file generated corresponding to an original model file of the target model; a timeout verification of a specified inference process during a model inference process; or a timeout verification of an entire inference process during the model inference process.

20 Claims, 9 Drawing Sheets

(51) Int. Cl.
*G06F 21/60* (2013.01)
*G06F 21/64* (2013.01)

(56) References Cited

U.S. PATENT DOCUMENTS

| | | | |
|---|---|---|---|
| 2020/0250312 A1 | 8/2020 | Kumar Addepalli et al. | |
| 2021/0042601 A1* | 2/2021 | Liu | H04L 9/0643 |
| 2021/0224704 A1* | 7/2021 | Waldo, IV | G06F 16/2365 |
| 2021/0232969 A1* | 7/2021 | Hu | G06F 3/1438 |
| 2021/0385266 A1* | 12/2021 | Lorenzi | H04L 41/22 |
| 2022/0147597 A1* | 5/2022 | Bhide | G06F 8/77 |
| 2022/0321647 A1* | 10/2022 | Berggren | H04L 67/10 |
| 2023/0027823 A1* | 1/2023 | Jones | G06F 8/443 |
| 2025/0068972 A1* | 2/2025 | Markwell | G06F 21/14 |

FOREIGN PATENT DOCUMENTS

| | | |
|---|---|---|
| CN | 111724248 | 9/2020 |
| CN | 111859379 | 10/2020 |
| CN | 111949972 | 11/2020 |
| CN | 112015470 | 12/2020 |
| CN | 112073188 | 12/2020 |
| CN | 113268737 | 8/2021 |
| CN | 113722683 | 11/2021 |
| JP | 2005031937 | 2/2005 |
| KR | 10-2020-0125644 | 11/2020 |
| KR | 10-2021-0021253 | 2/2021 |

OTHER PUBLICATIONS

Sun et al.; "SELWasm: A Code Protection Mechanism for WebAssembly," IEEE Intl Conf on Parallel & Distributed Processing with Applications, Big Data & Cloud Computing, Sustainable Computing & Communications, Social Computing & Networking, Xiamen, China, Dec. 16-18, 2019, pp. 1099-1110.*
International Search Report and Written Opinion issued in corresponding PCT Patent Application No. PCT/CN2022/082285, dated May 24, 2022.
Yunshuimushi: "TensorFlow.js Why the backend of WASM is introduced?", cloud.tencent.com/developer/article/1646410 (accessed on Sep. 29, 2022) (Jun. 17, 2020).
Office Action issued in corresponding Japanese Patent Application No. 2022-559937, dated Nov. 21, 2023.
Office Action issued in Chinese Patent Application No. 202111007976.8, dated May 22, 2023.
Office Action issued in corresponding Korean Patent Application No. 10-2022-7033945, dated Sep. 26, 2024.
S. Park et al., "Fuzzing Method for Web-Assembly Module Safety Validation", Journal of the Korean Institute of Information Security & Cryptology, vol. 29, No. 2, pp. 275-285 (2019).

* cited by examiner

300

A WASM file is generated, the WASM file is used to provide a runtime environment for a target model, and the WASM file contains a corresponding model inference algorithm and a corresponding security verification algorithm ⸺ S310

FIG. 3A

METHOD AND SYSTEM OF PROTECTING MODEL, DEVICE, AND STORAGE MEDIUM

This application is the U.S. national phase entry of PCT/CN2022/082285 filed on Mar. 22, 2022, which claims priority to Chinese Patent Application No. 202111007976.8 filed on Aug. 30, 2021, which is incorporated herein by reference in its entirety.

TECHNICAL FIELD

The present disclosure relates to a field of computer technology, in particular to a field of artificial intelligence technology, and may be applied to an AI model protection and other application scenarios.

BACKGROUND

A development of an artificial intelligence model (i.e. AI model) may involve significant financial and/or engineering resource investments. Furthermore, the development of the AI model is generally a knowledge acquisition process in a unique specific domain with intensive time and resources. Therefore, there is a need to provide an effective protection mechanism to protect the AI model.

SUMMARY

The present disclosure provides a method and a system of protecting a model, a device, and a storage medium.

According to an aspect of the present disclosure, a method of protecting a model for a server is provided, including: generating a WASM file, wherein the WASM file is configured to provide a runtime environment for a target model, and the WASM file contains a corresponding model inference algorithm and a corresponding security verification algorithm, wherein the security verification algorithm is configured to perform at least one security verification operation to protect the target model, the at least one security verification operation is selected from: a verification of a host environment; a verification of an integrity of the WASM file; a verification of an integrity of the model file, wherein the model file is generated corresponding to an original model file of the target model; a timeout verification of a specified inference process during a model inference process; or a timeout verification of an entire inference process during the model inference process.

According to another aspect of the present disclosure, a method of protecting a model for a client is provided, including: loading a model file generated corresponding to a target model; loading a WASM file, wherein the WASM file is configured to provide a runtime environment for the target model; transferring the model file into the runtime environment during an instantiation running of the WASM file to perform at least one security verification operation so as to activate a model protection mechanism for the target model, wherein the at least one security verification operation is selected from: a verification of a host environment; a verification of an integrity of the WASM file; a verification of an integrity of the model file; a timeout verification of a specified inference process during a model inference process; or a timeout verification of an entire inference process during the model inference process.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the methods described in embodiments of the present disclosure.

According to another aspect of the present disclosure, a non-transitory computer-readable storage medium having computer instructions therein is provided, and the computer instructions are configured to cause a computer to implement the methods described in embodiments of the present disclosure.

According to another aspect of the present disclosure, a system of protecting a model is provided, including a client and a server, wherein the client is configured to request a model information from the server; the server is configured to return a corresponding model information in response to the request of the client; the client is configured to, based on the model information returned by the server, load a model file generated corresponding to a target model; load a WASM file configured to provide a runtime environment for the target model; enable an instantiation running of the WASM file, and transfer the model file into the runtime environment, wherein the WASM file is configured to perform at least one security verification operation during the instantiation running to activate a model protection mechanism for the target model, the at least one security verification operation is selected from: a verification of a host environment; a verification of an integrity of the WASM file; a verification of an integrity of the model file; a timeout verification of a specified inference process during a model inference process; or a timeout verification of an entire inference process during the model inference process.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein:

FIG. 3A schematically shows a flowchart of a method of protecting a model for a server according to embodiments of the present disclosure;

DETAILED DESCRIPTION OF EMBODIMENTS

Figure 1:
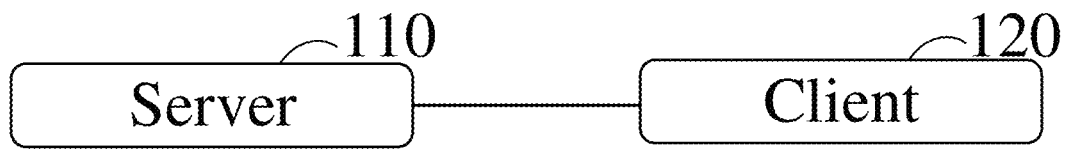
FIG. 1 schematically shows a system architecture suitable for embodiments of the present disclosure.

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

It should be understood that AI computing on a Web platform may perform a model inference process in a host environment and obtain a corresponding computing result by using an AI computing power provided by a Web environment such as a browser and an applet. However, if a model is deployed and inferred in the Web environment, the following problems may exist. A model information needs to be transmitted through a network, so it is easy to leak. A topology of the model needs to be generated and optimized during a JS (Java script) running process on a client, so the model is easy to be debugged or tampered with. The model needs to perform an inference operation during the JS running process, so the topology of the model and weight data of the model may be easily acquired or derived.

Therefore, for an application scenario with a high confidentiality requirement, a model may not be deployed and inferred directly in the Web environment.

Therefore, for the AI computing on the Web platform, a model information may be protected by the following two solutions.

In solution 1, an AI model is deployed and inferred on a server.

For example, a client may carry model input data and send a model inference request to the server. In response to the model inference request from the client, the server may perform a corresponding model inference operation, and return an inference result through a network after performing the model inference.

In solution 2, the AI computing is performed based on a model inference ability provided by a host of the Web environment, such as a browser, an applet, or the like.

For example, the client may call the AI computing power provided by the host through JS Bridge and other methods when JS (Java script) is running. In such a solution, it is also needed to transmit the model input data, and it is needed to trigger a callback provided by the client to return the inference result after the model inference is performed by the host.

It should be understood that, as the client needs to transmit the model input data to the server through the network, solution 1 has disadvantages such as a user data leakage, a network traffic consumption, a data transmission delay, etc., and it is not suitable for real-time video stream processing and other application scenarios with an extremely high requirement for time delay.

It should also be understood that, due to the need to parse the transmitted data during a communication between the client and the host, solution 2 is also not suitable for real-time video stream processing and other application scenarios with an extremely high requirement for time delay. In addition, as a Web development needs to adapt to different types of host environments such as Android and IOS, solution 2 needs a cross-end development and a continuous release of versions, then an iteration speed may be slow and debugging may be cumbersome, which may lose original advantages of the Web development such as convenience and easy iteration.

In this regard, embodiments of the present disclosure provide a model protection solution suitable for an application scenario with an extremely high requirement for time delay, which may be used for real-time video stream processing and other scenarios. Moreover, a model security may be ensured more effectively.

The present disclosure will be described in detail below with reference to the accompanying drawings and specific embodiments.

A system architecture of a method and an apparatus of protecting a model suitable for embodiments of the present disclosure is described below.

FIG. 1 schematically shows a system architecture suitable for embodiments of the present disclosure. It should be noted that FIG. 1 is only an example of the system architecture to which embodiments of the present disclosure may be applied to help those skilled in the art understand the technical content of the present disclosure, but it does not mean that embodiments of the disclosure may not be used in other environments or scenarios.

As shown in FIG. 1, a system architecture 100 in embodiments of the present disclosure may include a server 110 and a client 120.

The server 110 may be used for an offline encryption, that is, to perform an encryption of a model file and an encryption of a WASM file. The server 110 may also perform an encryption of model weight data, an encryption of a model configuration information, and an encryption of a key for decryption.

The client 120 may request a model information from the server 110 to load the model file, the WASM file, the model weight data, the model configuration information, and the like.

It should be understood that the WASM file is a file in a WASM format, which is a binary bytecode file obtained by compiling a source code through a Web Assembly technology.

In embodiments of the disclosure, the WASM file may be used to encapsulate the Web environment for the model inference. Moreover, a decryption algorithm may be added to the WASM file for a model decryption. In addition, a security verification algorithm may be added to the WASM file to perform a security verification-related operation.

It should be understood that the model file, the WASM file, the model weight data, the model configuration information and the like may be encrypted to prevent a leakage of user data during transmission.

In addition, as the WASM file is a binary bytecode file which has a poor readability. If the Web environment for the model inference is encapsulated in the WASM file, it may be difficult to derive the model topology (including operators, dependencies between operators, and attributes of operators) and a model inference logic, so that the model may be protected.

In addition, by adding the decryption algorithm to the WASM file, the encrypted model-related information (such as the encrypted model file, model weight data, model configuration information, etc.) may be decrypted, so as to avoid a leakage of the model-related information caused by a decryption in the host environment.

In addition, the model security may be ensured by adding the security verification algorithm to the WASM file, for example, by verifying a security of the host environment.

It should be understood that the number of client and server shown in FIG. 1 is only schematic. According to implementation needs, any number of client and server may be provided.

An application scenario of the method and the apparatus of protecting the model suitable for embodiments of the present disclosure is described below.

It should be understood that the model protection scheme provided by embodiments of the present disclosure may be used for any type of data model protection scenarios, such as an AI model protection scenario.

According to embodiments of the present disclosure, the present disclosure provides a system of protecting a model.

Figure 2A:
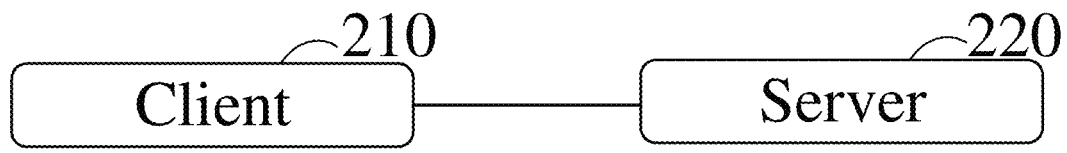
FIG. 2A schematically shows a block diagram of a system of protecting a model suitable for embodiments of the present disclosure.

FIG. 2A schematically shows a block diagram of a system of protecting a model suitable for embodiments of the present disclosure.

As shown in FIG. 2A, a system 200 of protecting a model may include a client 210 and a server 220.

The client 210 may request a model information from the server 220. The server 220 may return a corresponding model information in response to the request of the client 210.

Based on the model information returned by the server 220, the client 210 may load a model file generated corresponding to a target model; load a WASM file used to provide a runtime environment for the target model; enable an instantiation running of the WASM file, and transfer the model file to the runtime environment.

During the instantiation running of the WASM file, at least one security verification operation may be performed to activate a model protection mechanism for the target model, and the at least one security verification operation is selected from: a verification of a host environment; a verification of an integrity of the WASM file; a verification of an integrity of the model file; a timeout verification of a specified inference process during a model inference process; or a timeout verification of an entire inference process during the model inference process.

It should be noted that the model information returned by the server 220 may include, but is not limited to, an address of the encrypted model file, an address of the encrypted WASM file, the corresponding encrypted model configuration information (mainly including an input/output configuration of the model), and the encrypted weight data of the corresponding model.

In addition, in an embodiment, the model file generated corresponding to the target model may be an original model file of the target model or a product obtained by encrypting the original model file.

Alternatively, in an embodiment, the model file generated corresponding to the target model may be an intermediate product obtained by processing the original model file of the target model, or a product obtained by encrypting the intermediate product.

For example, a topology of the target model may be determined based on the original model file of the target model, and then the intermediate product of the original model file may be obtained by obfuscating the attributes of operators in the topology and the dependencies between operators.

It should be understood that the above obfuscation may further ensure that the topology of the model may not be easily derived.

It should also be understood that the WASM file may be generated corresponding to the topology of the target model, so that the WASM file may provide the target model with a runtime environment (such as a Web environment) during the instantiation running process, so as to perform the corresponding model inference.

Furthermore, a decryption algorithm may be added to the WASM file for a model decryption (for example, a decryption of the encrypted model file, model weight data, model configuration information, etc.).

Moreover, the encrypted WASM file may be decrypted in the host environment of the client.

In addition, a security verification algorithm may be added to the WASM file to perform a security verification-related operation.

For example, it is possible to verify the host environment, such as verifying whether a domain name and/or a user name of the host environment are/is in a corresponding white list. If a verification result indicates that the domain name and/or the user name of the host environment are/is in the corresponding white list, the verification is successful. In response to the verification being successful, the decryption algorithm and the model inference algorithm may be executed during the instantiation running process of the WASM file, so as to ensure the model security during the operation. In response to the verification failing, the model inference may be terminated.

For example, the verification of the integrity of the WASM file may avoid a model security problem caused by a tampering of the WASM file.

For example, the verification of the integrity of the model file may avoid a model security problem caused by a tampering of the model file.

For example, during the model inference process, a timeout verification may be performed on a specified inference process. Specifically, an anti-debugging mechanism may be set, such as burying (event tracking) critical paths in advance, and then verifying whether an inference process between the buried critical paths (such as an inference process from A to B) times out during running. It should be understood that if the verification result indicates that the specified inference process has timed out, it indicates that there is a possibility that the model is debugged during the inference process. In this case, the model inference may be terminated to ensure the model security. If the verification result indicates that the specified inference process has not timed out, it indicates that the inference process is normal, and a subsequent model inference operation may be continued.

For example, during the model inference process, a timeout verification may be performed for the entire inference process. It should be understood that if a verification result indicates that the inference process has timed out, it indicates that there is a possibility that the model is debugged during the inference process. In this case, the model inference may be terminated to ensure the model security. If the verification result indicates that the entire inference process has not timed out, it indicates that the inference process is normal.

Through embodiments of the disclosure, on the server side, by encrypting and compressing the model file before transmitting to the client, it is possible to avoid a data leakage during transmission and save a network traffic for users. On the client side, by encapsulating the runtime environment of the model by the WASM file and exposing a limited call interface to an external Web host environment, it is possible to prevent a model content (such as the model topology, including operators and attributes thereof contained in the model as well as dependencies between operators, etc.) from being easily derived and easily acquired. Moreover, the use of the file integrity verification mechanism may ensure the model security, such as finding a tampering of model in time. In addition, the use of the model anti-debugging mechanism may ensure the model security, such as timely preventing the model from being debugged during the running process. Therefore, a use of an instant security verification mechanism may ensure the model security more comprehensively.

As optional embodiments, the client may send an authentication request to the server before requesting the model information from the server. The server may perform an authentication operation and return a corresponding authentication result in response to the authentication request from the client. The client may request the model information from the server if the authentication result indicates that the authentication is successful.

If the authentication result indicates that the authentication fails, the client is not allowed to request the model information from the server.

In embodiments of the present disclosure, the model information may be acquired after the authentication is successful during the client JS running process. The model information may include the address of the encrypted model file, the address of the encrypted WASM file, the encrypted relevant model configuration information (mainly including the input/output configuration of the model), and the encrypted weight data of the model.

In embodiments of the present disclosure, an authentication service may follow an OAuth2.0 authorization standard. An AI model provider may provide an AK (Access Key Id, used to identify a user) for authentication and verification to a model user. The model user may send an authentication request to the server, such as an authentication server, through the client to acquire an authentication token (the token is checked before a transmission of some data, and different tokens are previously authorized for different data operations). Then the client may send a model information acquisition request carrying a token to the server, and the server may return a corresponding model information to the client based on the token carried by the request.

Through embodiments of the present disclosure, the model information is acquired by means of authorized access, which may ensure the security of the model information.

Figure 2B:
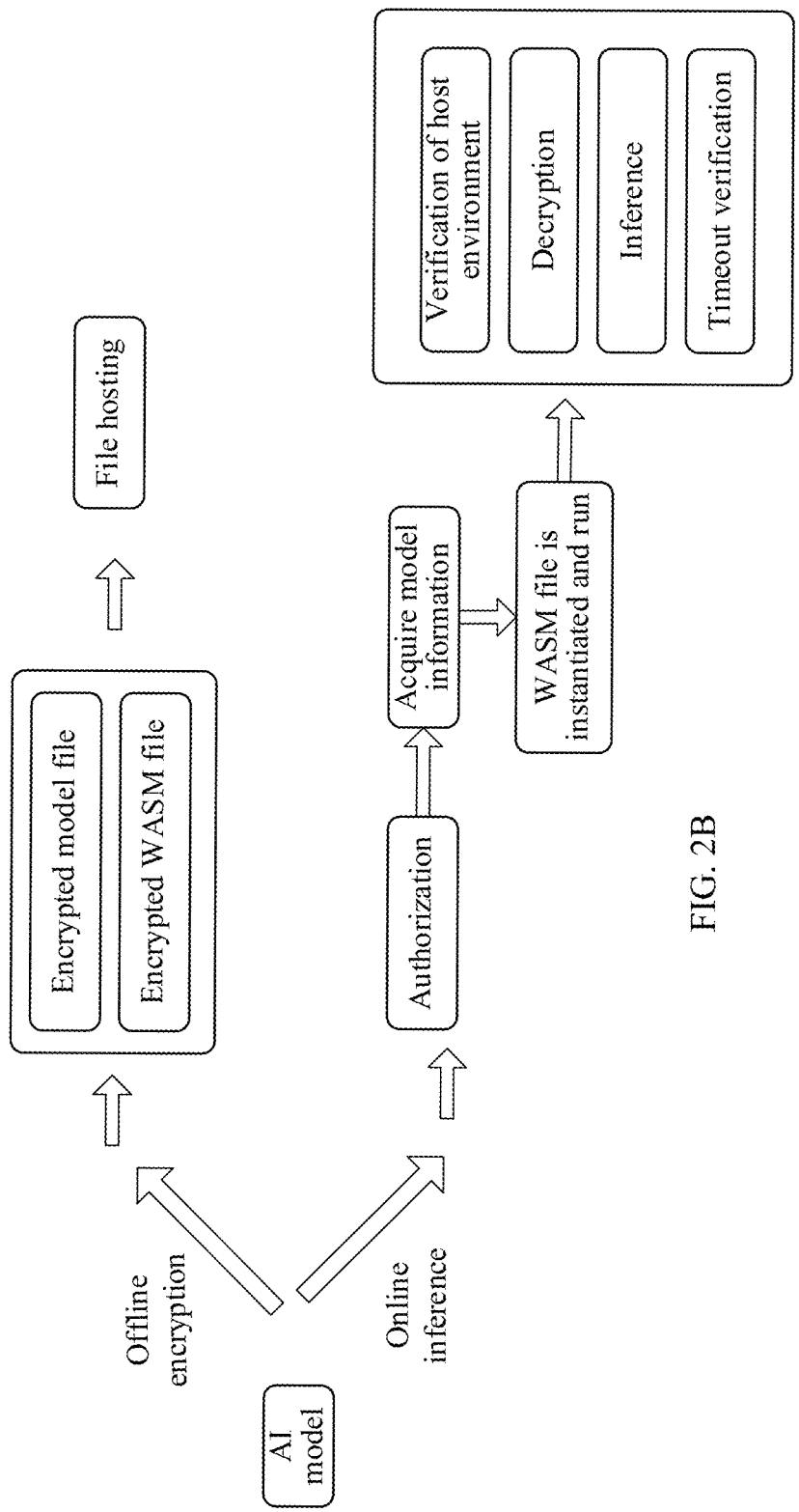
FIG. 2B schematically shows a schematic diagram of an offline encryption and an online inference for a model suitable for embodiments of the present disclosure.

FIG. 2B schematically shows a schematic diagram of an offline encryption and an online inference for a model suitable for embodiments of the present disclosure. As shown in FIG. 2B, in such a solution, for any model that needs to be protected, the model file and the corresponding WASM file used for decryption, inference and security verification may be encrypted separately through the offline encryption, and the encrypted files may be safely hosted. During the online inference, the client may acquire the model information through a user authentication (that is, performing the authentication on the model user), and perform decryption, decoding, inference, security verification (such as host environment verification and timeout verification) and other operations during the instantiation running of the WASM file.

According to embodiments of the present disclosure, the present disclosure provides a method of protecting a model for a server.

FIG. 3A schematically shows a flowchart of a method of protecting a model for a server according to embodiments of the present disclosure.

As shown in FIG. 3A, a method 300 of protecting a model may include operation S310.

In operation S310, a WASM file is generated. The WASM file is used to provide a runtime environment for a target model, and the WASM file contains a corresponding model inference algorithm and a corresponding security verification algorithm.

The security verification algorithm may protect the target model by performing at least one security verification operation selected from: a verification of a host environment; a verification of an integrity of the WASM file; a verification of an integrity of a model file generated corresponding to an original model file of the target model; a timeout verification of a specified inference process during a model inference process; or a timeout verification of an entire inference process during the model inference process.

For example, in an embodiment, a topology of the target model may be determined according to the original model file of the target model, and a model inference logic in the WASM file may be generated based on the topology of the target model. Then, the generated WASM file may provide a corresponding runtime environment for the target model.

In addition, a decryption algorithm may be added to the WASM file for a model decryption (for example, decryption of the encrypted model file, model weight data, model configuration information, etc.).

Moreover, the encrypted WASM file may be decrypted in the host environment of the client.

In addition, a security verification algorithm may be added to the WASM file to perform a security verification-related operation.

For example, it is possible to verify the host environment, such as verifying whether a domain name and/or a user name of the host environment are/is in a corresponding white list. If a verification result indicates that the domain name and/or the user name of the host environment are/is in the corresponding white list, the verification is successful. In response to the verification being successful, the decryption algorithm and the model inference algorithm may be executed during the instantiation running process of the WASM file, so as to ensure the model security during the running. In response to the verification failing, the model inference may be terminated.

For example, the verification of the integrity of the WASM file may avoid a model security problem caused by a tampering of the WASM file.

For example, the verification of the integrity of the model file may avoid a model security problem caused by a tampering of the model file.

For example, during the model inference process, a timeout verification may be performed on a specified inference process. Specifically, an anti-debugging mechanism may be set, such as burying critical paths in advance, and then verifying whether an inference process between the buried critical paths (such as an inference process from A to B)

times out during the running. It should be understood that if the verification result indicates that the specified inference process has timed out, it indicates that there is a possibility that the model is debugged in the inference process. In this case, the model inference may be terminated to ensure the model security. If the verification result indicates that the specified inference process has not timed out, it indicates that the inference process is normal, and a subsequent model inference operation may be continued.

For example, during the model inference process, a timeout verification may be performed for the entire inference process. It should be understood that if a verification result indicates that the inference process has timed out, it indicates that there is a possibility that the model is debugged in the inference process. In this case, the model inference may be terminated to ensure the model security. If the verification result indicates that the entire inference process has not timed out, it indicates that the inference process is normal.

It should be understood that the method of protecting the model provided in such embodiments is applied to the server. For the description of the method, reference may be made to the related description in the aforementioned embodiments of the system of protecting the model, which will not be repeated in embodiments of the present disclosure.

For example, when generating the WASM file for the decryption, the inference and the security verification, a WASM backend computing scheme of a model front-end inference engine may be selected to compile the WASM file required for the online inference, which may include a decryption algorithm, a security verification algorithm, a model inference algorithm, and other algorithms.

Moreover, for example, when generating the encrypted model file, a Plain JS backend computing scheme of the model front-end inference engine may be selected to construct the topology of the model, and then the intermediate product may be encrypted to generate an encrypted model file. It should be understood that in this scheme, the intermediate content and data obtained by processing the original model structure and model data are encrypted instead of encrypting the original model structure and model data, which may increase a difficulty of the model being cracked, so that the model may be protected better. In such embodiments, an AES symmetric encryption algorithm may be used as the encryption algorithm.

In addition, in such embodiments, when generating the WASM file, an information required by the WASM backend computing scheme may be extracted based on the topology of the target model, and the WASM file may be generated based on the extracted information.

Through embodiments of the disclosure, on the server side, by encrypting and compressing the model file before transmitting to the client, it is possible to avoid a data leakage during transmission and save a network traffic for users. On the client side, by encapsulating the runtime environment of the model by the WASM file and exposing a limited call interface to an external Web host environment, it is possible to prevent the topology of the model from being easily derived and easily acquired. Moreover, the use of the file integrity verification mechanism may ensure the model security, such as finding a tampering of model in time. In addition, the use of the model anti-debugging mechanism may ensure the model security, such as timely preventing the model from being debugged in the running process. Therefore, a use of an instant security verification mechanism may ensure the model security more comprehensively.

It should be understood that the model protection scheme for AI computing on the Web platform provided by embodiments of the present disclosure may effectively solve the security problem of the model in the Web environment. And on the premise of ensuring the model security: different from deploying and inferring the AI model on the server, in this solution, the model may be deployed and inferred completely in the Web environment, and there is no need to transmit user data to the server through the network, which protects a user privacy, saves a traffic for users, and reduce a network latency; different from relying on an end capability corresponding to the model inference provided by the host where the Web environment is located, in this solution, it is not necessary to rely on the host to develop the corresponding inference function and release the version, then a cross-end development cost and a front-end adaptation cost may be saved, and there is also no need to transmit the model input data to the host environment, which reduces the time delay.

As optional embodiments, the method may further include at least one selected from: encrypting the model file to obtain an encrypted model file; encrypting the WASM file to obtain an encrypted WASM file; encrypting a model configuration information of the target model to obtain an encrypted model configuration information; or encrypting weight data of the target model to obtain encrypted weight data.

The WASM file also contains a corresponding decryption algorithm used to decrypt at least one selected from: the encrypted model file, the encrypted model configuration information, or the encrypted weight data.

In embodiments of the disclosure, an AES symmetric encryption algorithm may be used as the encryption algorithm.

It should be understood that the encryption of the model file, the, WASM file, the model configuration information and the model weight data may effectively prevent a leakage of user data during the hosting process and may effectively prevent a leakage of user data in the transmission process.

In addition, the corresponding decryption algorithm is added to the WASM file, and the encrypted model file, the encrypted model configuration information and the encrypted weight data are decrypted during the instantiation running of the WASM file, which may prevent the above-mentioned contents from being easily acquired after decryption.

In embodiments of the present disclosure, the privacy of the model may be further protected by encrypting the above-mentioned contents.

Further, as optional embodiments, the method may further include: encrypting a key for decryption to obtain an encrypted key.

It should be understood that a secondary encryption may be achieved by encrypting the key for decryption. Therefore, in a front-end and back-end communication (that is, in the communication between the client and the server), a safe transmission of information may be ensured by hiding the key for decryption.

In embodiments of the present disclosure, the key for decryption may be encrypted using a RSA asymmetric encryption algorithm to generate the encrypted key for decryption.

In addition, in embodiments of the present disclosure, the key for encryption may also be encrypted using the RSA asymmetric encryption algorithm to generate an encrypted key for encryption.

In embodiments of the present disclosure, the model privacy may be further protected by the secondary encryption of the key for decryption.

As optional embodiments, the method may further include: for the target model, configuring an access key identifier for each of at least one user.

In embodiments of the present disclosure, the at least one user refers to a user of the target model. By configuring a unique access key identifier (AK) for the user of each target model, the user may be identified. Therefore, in the authentication service, the AK provided by the user (i.e. the model user) may be used to identify whether the user is a model user in a trusted domain. If the authentication result indicates that the user requesting an authentication is the model user in the trusted domain, it is determined that the authentication is successful, otherwise, it is determined that the authentication fails. The user is allowed to acquire the model information only after the authentication is successful. Otherwise, the user is not allowed to acquire the model information.

Through embodiments of the present disclosure, the authorized access method adopted for the model user may prevent the model information from being illegally acquired, so that the model may be protected.

Figure 3B:
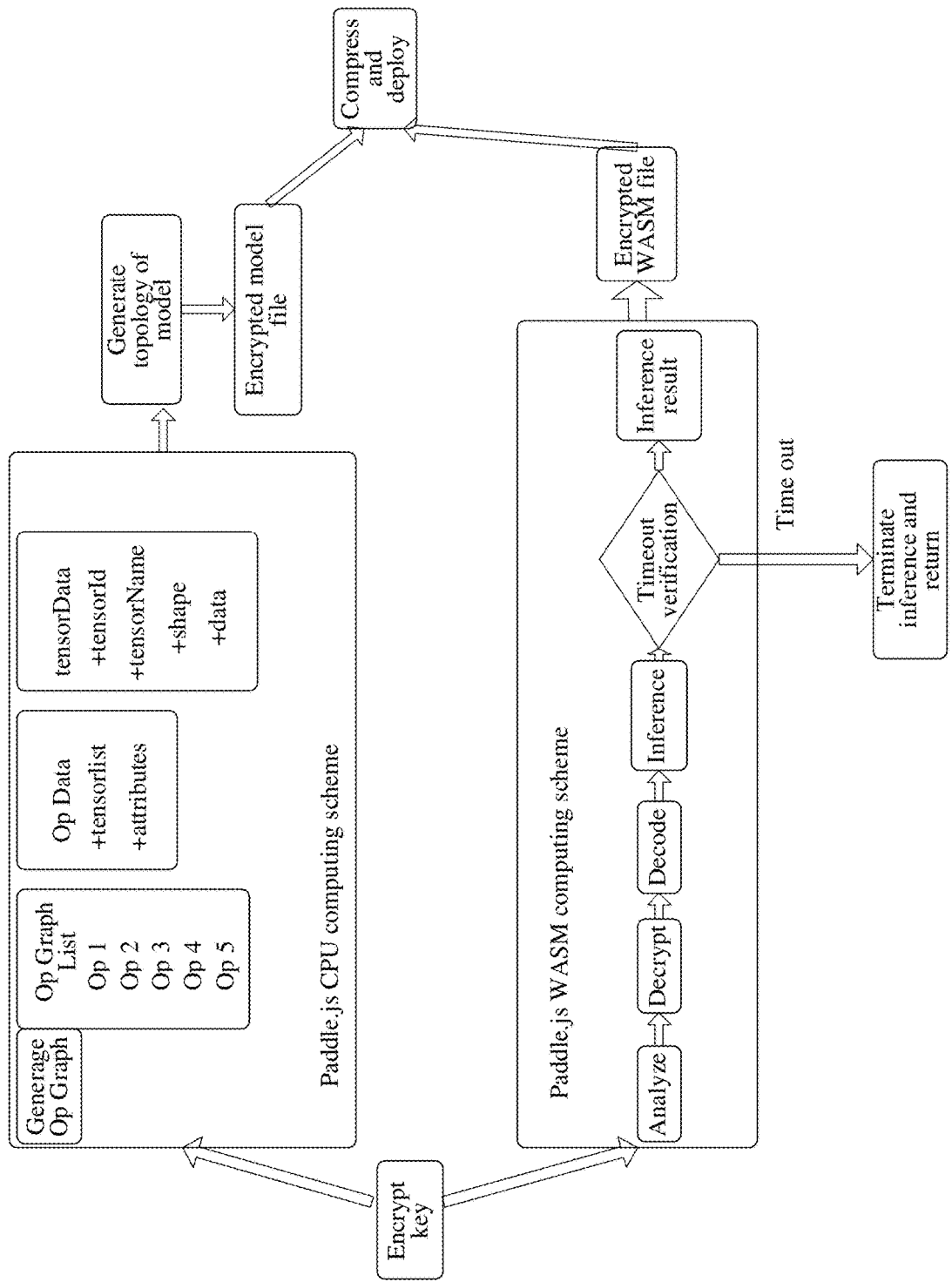
FIG. 3B schematically shows a schematic diagram of an offline generation of a model file and a WASM file according to embodiments of the present disclosure.

FIG. 3B schematically shows a schematic diagram of an offline generation of a model file and a WASM file according to embodiments of the present disclosure. As shown in FIG. 3B, the topology of the model may be generated in the Plain JS CPU computing scheme. After the topology is obfuscated and encrypted, the model file of the model may be generated, and then the generated model file may be compressed and deployed. As shown in FIG. 3B, a WASM file containing an analysis algorithm, a decryption algorithm, a decoding algorithm, an inference algorithm, a security verification algorithm and other algorithms may be generated in the Plain JS WASM computing scheme. After the WASM file is generated, this file may be encrypted, compressed and deployed. It should be understood that in such embodiments, the key for encryption may be dynamically generated or specified.

According to embodiments of the present disclosure, the present disclosure provides a method of protecting a model for a client.

Figure 4A:
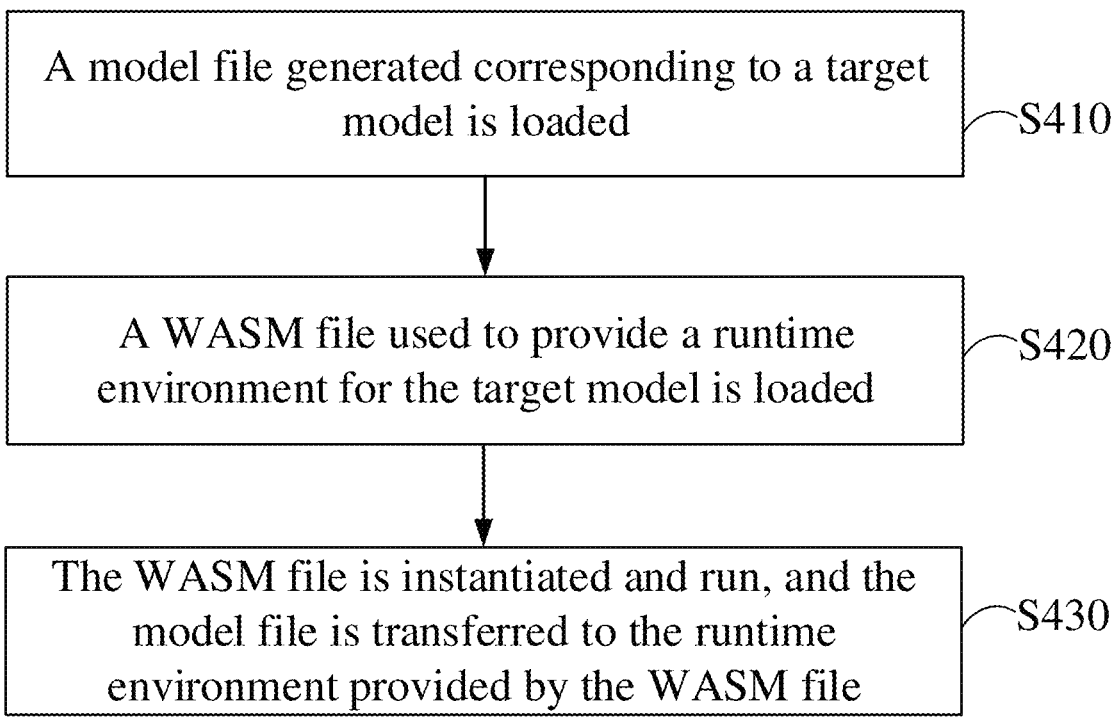
FIG. 4A schematically shows a flowchart of a method of protecting a model for a client according to embodiments of the present disclosure.

FIG. 4A schematically shows a flowchart of a method of protecting a model for a client according to embodiments of the present disclosure.

As shown in FIG. 4A, a method 400 of protecting a model for a client may include operation S410 to operation S430.

In operation S410, a model file generated corresponding to a target model is loaded.

In operation S420, a WASM file used to provide a runtime environment for the target model is loaded.

In operation S430, the WASM file is instantiated and run, and the model file is transferred to the runtime environment provided by the WASM file, so that at least one security verification operation is performed during the instantiation running of the WASM file to activate a model protection mechanism for the target model. The at least one security verification operation is selected from: a verification of a host environment; a verification of an integrity of the WASM file; a verification of an integrity of the model file; a timeout verification of a specified inference process during a model inference process; or a timeout verification of an entire inference process during the model inference process.

It should be understood that the methods of generating, encrypting, loading and decrypting the model file and the WASM file and other methods in such embodiments are the same or similar to those described in the aforementioned embodiments, which will not be repeated here.

It should be understood that the security verification methods in such embodiments are the same or similar to those described in the aforementioned embodiments, which will not be repeated here.

As optional embodiments, the model file and the WASM file are acquired and loaded in response to the user authentication being successful. It should be understood that the user authentication methods in such embodiments are the same or similar to those described in the aforementioned embodiments, which will not be repeated here.

As optional embodiments, at least one selected from the model file and the WASM file is an encrypted file. It should be understood that the methods of encrypting the model file and the WASM file in such embodiments are the same or similar to those described in the aforementioned embodiments, which will not be repeated here.

As optional embodiments, the method may further include: during the instantiation running of the WASM file, decrypting the encrypted model file to obtain a decrypted model file, in response to a predetermined security verification being successful; and performing a model inference based on the decrypted model file.

As optional embodiments, the predetermined security verification may include at least one selected from: a verification of the host environment, a verification of an integrity of the model file, or a verification of an integrity of the WASM file. Through embodiments of the present disclosure, a leakage of model content (such as the topology of the model) or data due to an improper decryption time instant may be prevented.

As optional embodiments, decrypting the encrypted model file may include: acquiring an encrypted key for decryption; decrypting the encrypted key to obtain a decrypted key; and decrypting the encrypted model file using the decrypted key. In embodiments of the present disclosure, the key for decryption may be read dynamically during the decryption. In embodiments of the present disclosure, the model privacy may be further protected by the secondary encryption of the key used for decryption.

Figure 4B:
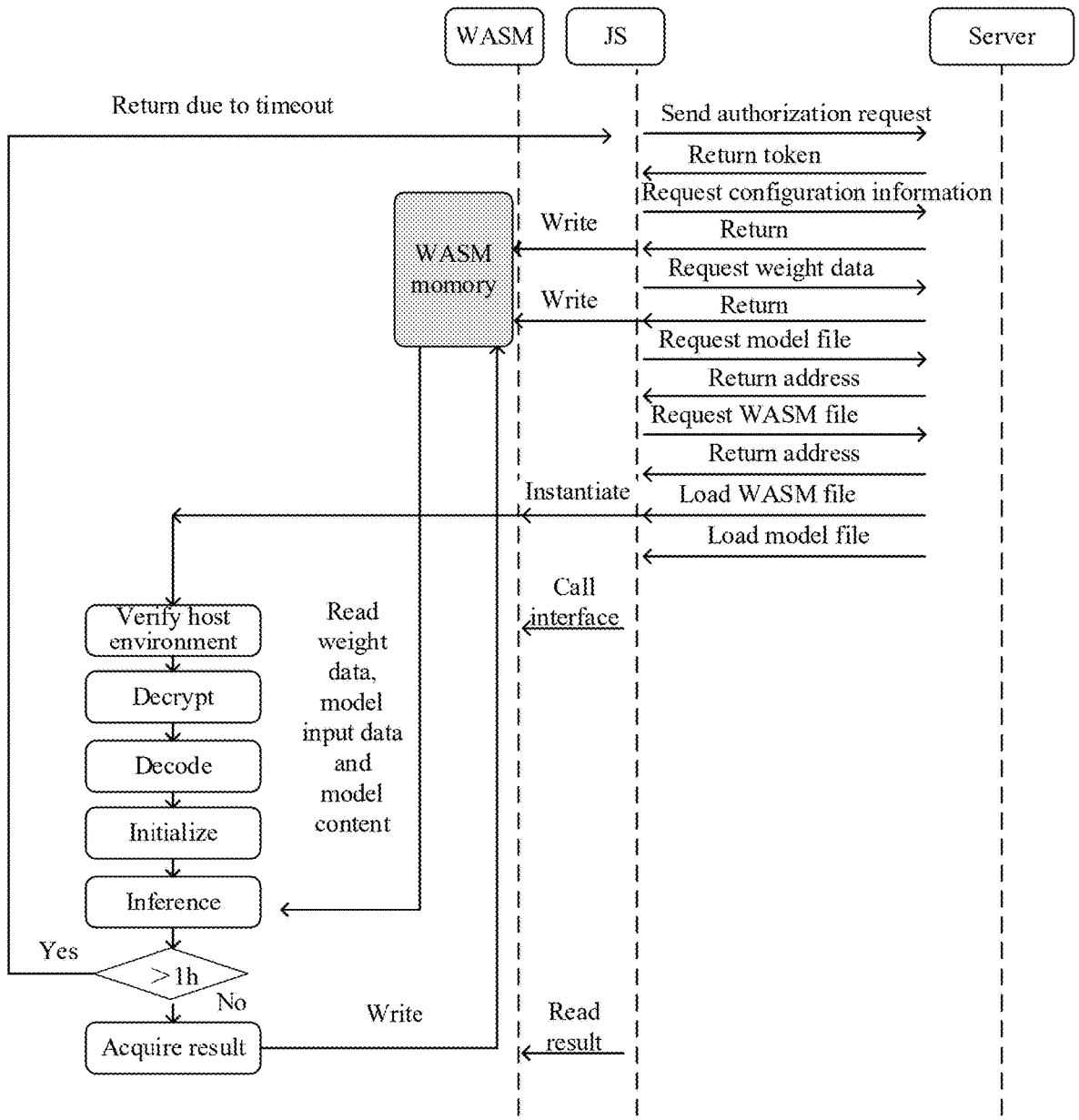
FIG. 4B schematically shows a sequence diagram of an online inference for a model according to embodiments of the present disclosure.

FIG. 4B schematically shows a time sequence diagram of an online inference for a model according to embodiments of the present disclosure. As shown in FIG. 4B, a time sequence of the online inference for the model is as follows. A client sends an authentication request to a server during the running process of the client JS; the server performs an authentication operation in response to the request, and returns an authentication token if the authentication is successful; the client sends a model configuration information request, a model weight data request, an address request for the encrypted model file, an address request for the encrypted WASM file, and other model information request carrying the authentication token to the server in parallel during the running process of the client JS; the server returns corresponding model information in response to these requests; the client loads the encrypted WASM file and the encrypted model file during the running process of the client JS; the client instantiates the WASM file during the running process of the client JS, and writes model weight data, model input data, model structure content, etc. into a memory of a WASM module and generates a corresponding address map; the WASM module (obtained from the instantiation of the model file) performs a verification of the host environment (such as confirming a user identity by a signature handshake mechanism with the server), a decryption, a decoding, an initialization, an inference, and a time limit verification (that is, verifying whether the entire inference process has timed out, for example, verifying whether the entire inference process has exceeded 1 h, and exiting if it has timed out) during the running of the WASM module; the WASM module writes an inference result into the memory of the WASM module; the client may call an exposed call interface of the WASM module during the running process of the client JS, such as calling the corresponding interface to read the corresponding inference result.

Figure 5:
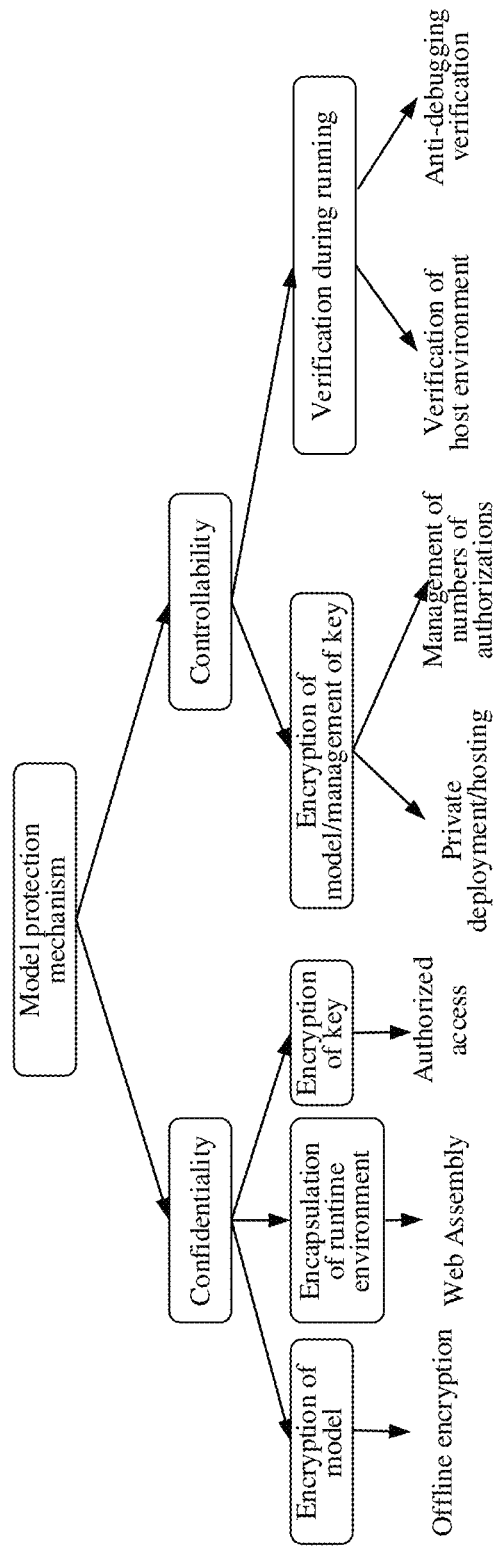
FIG. 5 schematically shows a schematic diagram of a model protection mechanism according to embodiments of the present disclosure.

FIG. 5 schematically shows a schematic diagram of a model protection mechanism according to embodiments of the present disclosure. As shown in FIG. 5, the model protection mechanism may ensure the security of the model from aspects of confidentiality and controllability. For the confidentiality of the model, the security of the model itself may be ensured by the offline model encryption; a leakage of the model structure and the model data during the running may be prevented by encapsulating the decryption and inference process into an unreadable WASM file (that is, encapsulating the runtime environment); the secondary asymmetrical encryption of the key used for decryption and the authorized access method for acquiring the key may ensure the security of the key. For the controllability of the model, an offline private deployment is used for the encryption of the model and the key to ensure the security of the encryption environment; the key for decryption is acquired by a separate authorized access service (that is, a management of numbers of authorizations) to ensure the security of the key; a host environment verification, a code integrity verification, and an anti-debugging verification (such as a timeout verification of a specified inference process and a timeout verification of an entire inference process, where the latter is also a verification of a valid time limit of running) may be performed during the model running to ensure the security of the running model and prevent a model theft.

According to embodiments of the present disclosure, the present disclosure further provides an apparatus of protecting a model for a server.

Figure 6:
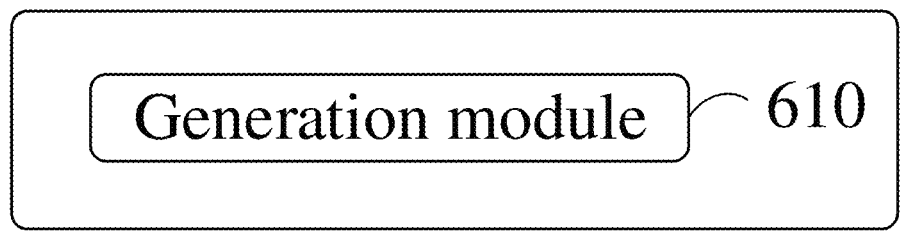
FIG. 6 schematically shows a block diagram of an apparatus of protecting a model for a server according to embodiments of the present disclosure.

FIG. 6 schematically shows a block diagram of an apparatus of protecting a model for a server according to embodiments of the present disclosure.

As shown in FIG. 6, an apparatus 600 of protecting a model may include a generation module 610.

The generation module 610 is used to generate a WASM file used to provide a runtime environment for a target model, where the WASM file contains a corresponding model inference algorithm and a corresponding security verification algorithm.

The security verification algorithm is used to perform at least one security verification operation to protect the target model, the at least one security verification operation is selected from: a verification of a host environment; a verification of an integrity of the WASM file; a verification of an integrity of the model file, where the model file is generated corresponding to an original model file of the target model; a timeout verification of a specified inference process during a model inference process; or a timeout verification of an entire inference process during the model inference process.

As optional embodiments, the apparatus may further include at least one module selected from: a first encryption module used to encrypt the model file to obtain an encrypted model file; a second encryption module used to encrypt the WASM file to obtain an encrypted WASM file; a third encryption module used to encrypt a model configuration information of the target model to obtain an encrypted model configuration information; or a fourth encryption module used to encrypt weight data of the target model to obtain encrypted weight data, where the WASM file further contains a corresponding decryption algorithm used to decrypt at least one selected from: the encrypted model file, the encrypted model configuration information, or the encrypted weight data.

As optional embodiments, the apparatus may further include: a fifth encryption module used to encrypt a key for decryption to obtain an encrypted key.

As optional embodiments, the apparatus may further include a configuration module used to, for the target model, configure an access key identifier to each of at least one user.

It should be understood that embodiments of the apparatus part of the present disclosure correspond to identical or similar embodiments of the method part of the present disclosure, and the technical problems solved and the technical effects achieved also correspond to same or similar ones, which will not be repeated here.

According to embodiments of the present disclosure, the present disclosure further provides an apparatus of protecting a model for a client.

Figure 7:
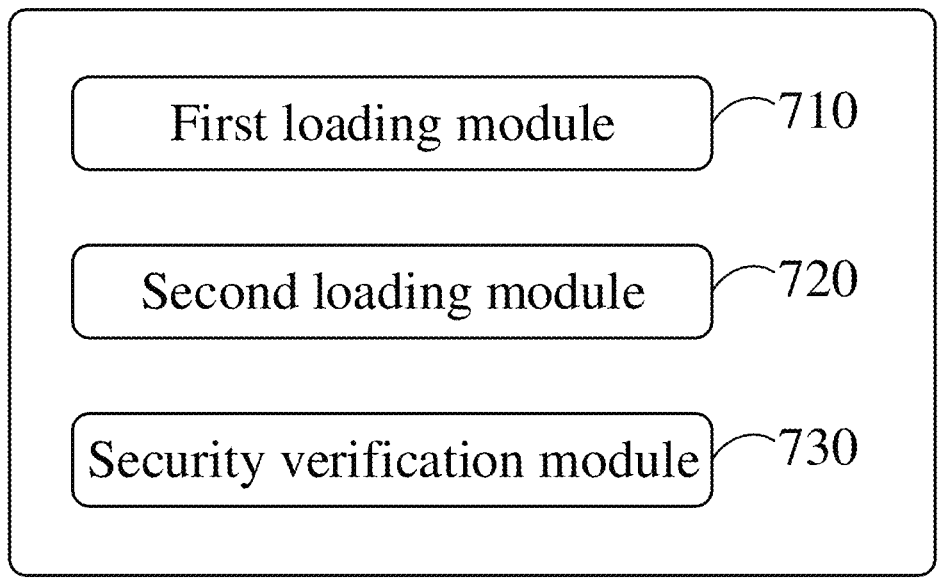
FIG. 7 schematically shows a block diagram of an apparatus of protecting a model for a client according to embodiments of the present disclosure.

FIG. 7 schematically shows a block diagram of an apparatus of protecting a model for a client according to embodiments of the present disclosure.

As shown in FIG. 7, an apparatus 700 of protecting a model may include a first loading module 710, a second loading module 720, and a security verification module 730.

The first loading module 710 is used to load a model file generated corresponding to a target model.

The second loading module 720 is used to load a WASM file used to provide a runtime environment for the target model.

The security verification module 730 is used to transfer the model file into the runtime environment during an instantiation running of the WASM file to perform at least one security verification operation so as to activate a model protection mechanism for the target model, where the at least one security verification operation is selected from: a verification of a host environment; a verification of an integrity of the WASM file; a verification of an integrity of the model file; a timeout verification of a specified inference process during a model inference process; or a timeout verification of an entire inference process during the model inference process.

As optional embodiments, the model file is acquired and loaded by the first loading module and the WASM file is acquired and loaded by the second loading module, in response to a user authentication being successful.

As optional embodiments, at least one of the model file and the WASM file is an encrypted file.

As optional embodiments, the apparatus may further include: a decryption module used to, during the instantiation running of the WASM file, decrypt an encrypted model file to obtain a decrypted model file, in response to a predetermined security verification being successful; and a model inference module used to perform a model inference based on the decrypted model file.

As optional embodiments, the predetermined security verification includes at least one selected from: a verification of a host environment, a verification of an integrity of the WASM file, or a verification of an integrity of the model file.

As optional embodiments, the decryption module includes: an acquisition unit used to acquire an encrypted key for decryption; a first decryption unit used to decrypt the encrypted key to obtain a decrypted key; and a second decryption unit used to decrypt the encrypted model file using the decrypted key.

It should be understood that embodiments of the apparatus part of the present disclosure correspond to identical or similar embodiments of the method part of the present disclosure, and the technical problems solved and the technical effects achieved also correspond to same or similar ones, which will not be repeated here.

According to embodiments of the present disclosure, the present disclosure further provides an electronic device, a readable storage medium, and a computer program product.

Figure 8:
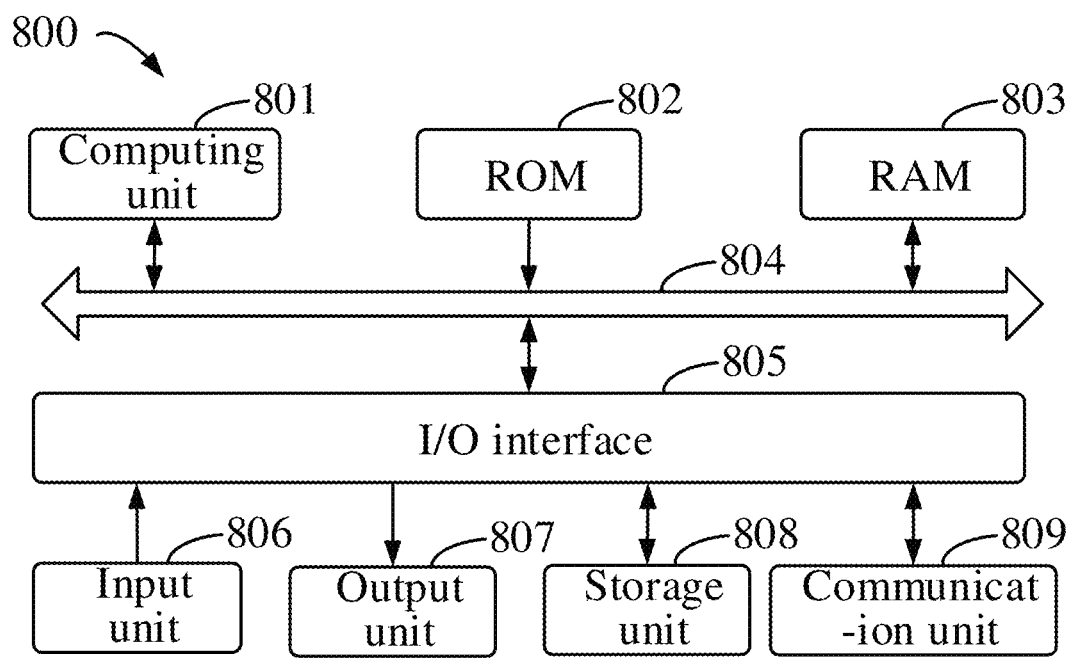
FIG. 8 schematically shows a block diagram of an electronic device for implementing a method of protecting a model of embodiments of the present disclosure.

FIG. 8 shows a schematic block diagram of an exemplary electronic device 800 provided by embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device 800 includes a computing unit 801 which may perform various appropriate actions and processes according to a computer program stored in a read only memory (ROM) 802 or a computer program loaded from a storage unit 808 into a random access memory (RAM) 803. In the RAM 803, various programs and data necessary for an operation of the electronic device 800 may also be stored. The computing unit 801, the ROM 802 and the RAM 803 are connected to each other through a bus 804. An input/output (I/O) interface 805 is also connected to the bus 804.

A plurality of components in the electronic device 800 are connected to the I/O interface 805, including: an input unit 806, such as a keyboard, or a mouse; an output unit 807, such as displays or speakers of various types; a storage unit 808, such as a disk, or an optical disc; and a communication unit 809, such as a network card, a modem, or a wireless communication transceiver. The communication unit 809 allows the electronic device 800 to exchange information/data with other devices through a computer network such as Internet and/or various telecommunication networks.

The computing unit 801 may be various general-purpose and/or dedicated processing assemblies having processing and computing capabilities. Some examples of the computing unit 801 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 801 executes various methods and processes described above, such as the method of protecting the model. For example, in some embodiments, the method of protecting the model may be implemented as a computer software program which is tangibly embodied in a machine-readable medium, such as the storage unit 808. In some embodiments, the computer program may be partially or entirely loaded and/or installed in the electronic device 800 via the ROM 802 and/or the communication unit 809. The computer program, when loaded in the RAM 803 and executed by the computing unit 801, may execute one or more steps in the method of protecting the model. Alternatively, in other embodiments, the computing unit 801 may be used to perform the method of protecting the model by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, also known as a cloud computing server or a cloud host, which is a host product in a cloud computing service system to solve shortcomings of difficult management and weak business scalability existing in an existing physical host and VPS (Virtual Private Server) service. The server may also be a server of a distributed system or a server combined with a block-chain.

In the technical solution of the present disclosure, a collection, a storage, a use, a processing, a transmission, a provision, a disclosure and an application of user personal information involved comply with provisions of relevant laws and regulations, and do not violate public order and good custom.

In the technical solution of the present disclosure, the acquisition or collection of user personal information has been authorized or allowed by users. It should be understood that steps of the processes illustrated above may be reordered, added or deleted in various manners. For example, the steps described in the present disclosure may be performed in parallel, in sequence, or in a different order, as long as a desired result for the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of protecting a model, the method comprising:
   generating a WASM file, wherein the WASM file is configured to provide a runtime environment for a target model, and the WASM file contains a corresponding model inference algorithm and a corresponding security verification algorithm,
   wherein the security verification algorithm is configured to perform at least one security verification operation to protect the target model, the at least one security verification operation is selected from:
   a verification of a host environment;
   a verification of an integrity of the WASM file;
   a verification of an integrity of a model file, wherein the model file is an encrypted file generated corresponding to an original model file of the target model;
   a timeout verification of a specified inference process during a model inference process; or
   a timeout verification of an entire inference process during the model inference process,
   wherein the model file is obtained by:
   determining a topology of the target model based on the original model file;
   obfuscating attributes of operators in the topology and dependencies between the operators to obtain an intermediate product of the original model file; and
   encrypting the intermediate product to obtain the model file.

2. The method according to claim 1, further comprising at least one selected from:
   encrypting the WASM file to obtain an encrypted WASM file;
   encrypting a model configuration information of the target model to obtain an encrypted model configuration information; or
   encrypting weight data of the target model to obtain encrypted weight data,
   wherein the WASM file further contains a corresponding decryption algorithm, and the decryption algorithm is configured to decrypt at least one selected from: the encrypted model file, the encrypted model configuration information, or the encrypted weight data.

3. The method according to claim 2, further comprising encrypting a key for decryption to obtain an encrypted key.

4. The method according to claim 3, further comprising, for the target model, configuring an access key identifier for each of at least one user.

5. The method according to claim 2, further comprising, for the target model, configuring an access key identifier for each of at least one user.

6. The method according to claim 1, further comprising, for the target model, configuring an access key identifier for each of at least one user.

7. An electronic device, comprising:
   at least one processor; and
   a memory communicatively connected to the at least one processor, wherein the memory stores instructions executable by the at least one processor, and the instructions, when executed by the at least one processor, cause the at least one processor to implement the method according to claim 1.

8. The electronic device according to claim 7, wherein the instructions are further configured to cause the at least one processor to at least:
   encrypt the WASM file to obtain an encrypted WASM file; and/or
   encrypt a model configuration information of the target model to obtain an encrypted model configuration information; and/or
   encrypt weight data of the target model to obtain encrypted weight data,
   wherein the WASM file further contains a corresponding decryption algorithm, and the decryption algorithm is configured to decrypt at least one selected from: the encrypted model file, the encrypted model configuration information, or the encrypted weight data.

9. A non-transitory computer-readable storage medium having computer instructions therein, wherein the computer instructions are configured to cause a computer system to implement the method according to claim 1.

10. A method of protecting a model, the method comprising:
- loading a model file generated corresponding to a target model;
- loading a WASM file, wherein the WASM file is configured to provide a runtime environment for the target model;
- transferring, during an instantiation running of the WASM file, the model file into the runtime environment to perform at least one security verification operation so as to activate a model protection mechanism for the target model, wherein the at least one security verification operation is selected from:
  - a verification of a host environment;
  - a verification of an integrity of the WASM file;
  - a verification of an integrity of the model file;
  - a timeout verification of a specified inference process during a model inference process; or
  - a timeout verification of an entire inference process during the model inference process,
- wherein the model file is an encrypted file generated corresponding to an original model file of the target model, the model file is obtained by encrypting an intermediate product of the original model file, the intermediate product of the original model file is obtained by obfuscating attributes of operators in a topology of the target model and dependencies between the operators, and the topology of the target model is determined based on the original model file.

11. The method according to claim 10, wherein the model file and the WASM file are acquired and loaded in response to a user authentication being successful.

12. The method according to claim 11, wherein the WASM file is an encrypted file.

13. The method according to claim 10, wherein the WASM file is an encrypted file.

14. The method according to claim 13, further comprising: during the instantiation running of the WASM file,
- decrypting an encrypted model file to obtain a decrypted model file, in response to a predetermined security verification being successful; and
- performing a model inference based on the decrypted model file.

15. The method according to claim 14, wherein the predetermined security verification comprises at least one selected from: a verification of a host environment, a verification of an integrity of the WASM file, or a verification of an integrity of the model file.

16. The method according to claim 14, wherein the decrypting an encrypted model file comprises:
- acquiring an encrypted key for decryption;
- decrypting the encrypted key to obtain a decrypted key; and
- decrypting the encrypted model file using the decrypted key.

17. An electronic device, comprising:
- at least one processor; and
- a memory communicatively connected to the at least one processor, wherein the memory stores instructions executable by the at least one processor, and the instructions, when executed by the at least one processor, cause the at least one processor to implement the method according to claim 10.

18. A non-transitory computer-readable storage medium having computer instructions therein, wherein the computer instructions are configured to cause a computer system to implement the method according to claim 10.

19. A system of protecting a model, comprising a client and a server,
- wherein the client is configured to request a model information from the server; the server is configured to return a corresponding model information in response to the request of the client; and the client is configured to load a model file generated corresponding to a target model, load a WASM file configured to provide a runtime environment for the target model, and enable an instantiation running of the WASM file and transfer the model file into the runtime environment, based on the model information returned by the server, wherein the client and the server are computers, and
- wherein the WASM file is configured to perform at least one security verification operation during the instantiation running to activate a model protection mechanism for the target model, the at least one security verification operation is selected from:
- a verification of a host environment;
- a verification of an integrity of the WASM file;
- a verification of an integrity of the model file;
- a timeout verification of a specified inference process during a model inference process; or
- a timeout verification of an entire inference process during the model inference process,
- wherein the model file is an encrypted file generated corresponding to an original model file of the target model, the model file is obtained by encryption of an intermediate product of the original model file, the intermediate product of the original model file is obtained by obfuscation of attributes of operators in a topology of the target model and dependencies between the operators, and the topology of the target model is determined based on the original model file.

20. The system according to claim 19, wherein:
- the client is configured to send an authentication request to the server before requesting the model information from the server;
- the server is configured to perform an authentication operation and return an authentication result, in response to the authentication request from the client; and
- the client is configured to request the model information from the server, in response to the authentication result indicating that an authentication is successful.

* * * * *